United States Patent
Bell et al.

(10) Patent No.: US 10,147,235 B2
(45) Date of Patent: Dec. 4, 2018

(54) AR DISPLAY WITH ADJUSTABLE STEREO OVERLAP ZONE

(71) Applicant: Microsoft Technology Licensing, LLC, Redmond, WA (US)

(72) Inventors: Cynthia S. Bell, Kirkland, WA (US); Drew Steedly, Redmond, WA (US); Yarn Chee Poon, Redmond, WA (US); Joachim Pehserl, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 307 days.

(21) Appl. No.: 14/964,996

(22) Filed: Dec. 10, 2015

(65) Prior Publication Data

US 2017/0171538 A1    Jun. 15, 2017

(51) Int. Cl.
 *G09G 5/00* (2006.01)
 *G06T 19/00* (2011.01)
 *H04N 13/128* (2018.01)
 *H04N 13/344* (2018.01)

(52) U.S. Cl.
 CPC ......... *G06T 19/006* (2013.01); *H04N 13/128* (2018.05); *H04N 13/344* (2018.05)

(58) Field of Classification Search
 CPC ........... H04N 13/0022; H04N 13/0033; H04N 13/044; H04N 13/0425; H04N 13/0497; G06T 19/006
 USPC .............. 345/8, 471, 619, 690; 348/36, 559, 348/E5.137; 349/113; 715/732
 See application file for complete search history.

(56) References Cited

U.S. PATENT DOCUMENTS

| | | | | |
|---|---|---|---|---|
| 5,860,721 A | * | 1/1999 | Bowron | H04N 5/74 348/E5.137 |
| 6,088,006 A | * | 7/2000 | Tabata | H04N 13/0275 345/7 |
| 8,355,083 B2 | * | 1/2013 | Keiser | G06T 13/00 348/559 |
| 8,786,675 B2 | | 7/2014 | Deering | |
| 8,953,022 B2 | | 2/2015 | McArdle et al. | |
| 9,097,890 B2 | | 8/2015 | Miller et al. | |
| 2004/0046910 A1 | * | 3/2004 | Sasakura | G01D 11/28 349/113 |

(Continued)

FOREIGN PATENT DOCUMENTS

| | | | | |
|---|---|---|---|---|
| CN | 102722893 A | | 10/2012 | |
| KR | 101279869 | * | 5/2012 | G09B 9/08 |

(Continued)

OTHER PUBLICATIONS

State, et al., "Dynamic Virtual Convergence for Video see-through Head-Mounted Displays: Maintaining Maximum Stereo Overlap Throughout a Close-Range Work Space", In Proceedings of the IEEE and ACM International Symposium on Augmented Reality, Oct. 29, 2001, 10 pages.

(Continued)

*Primary Examiner* — Prabodh M Dharia
(74) *Attorney, Agent, or Firm* — Arent Fox LLP

(57) ABSTRACT

A system and method are disclosed for use in a virtual reality environment including a head mounted display device and a processing unit. In examples, the processing unit adjusts an amount by which left and right displayed images overlap each other at a given distance, such as the focal distance, from the head mounted display device.

19 Claims, 15 Drawing Sheets

(56) References Cited

U.S. PATENT DOCUMENTS

| | | | |
|---|---|---|---|
| 2006/0250322 A1 | 11/2006 | Hall et al. | |
| 2008/0117289 A1* | 5/2008 | Schowengerdt | G02B 26/005 348/46 |
| 2009/0113307 A1* | 4/2009 | MacKenzie | G06F 3/04845 715/732 |
| 2010/0045783 A1 | 2/2010 | State et al. | |
| 2010/0289724 A1* | 11/2010 | Scales | A63F 13/10 345/8 |
| 2011/0018903 A1 | 1/2011 | Lapstun et al. | |
| 2012/0120088 A1* | 5/2012 | Kitahara | A63F 13/42 345/589 |
| 2012/0154920 A1 | 6/2012 | Harrison et al. | |
| 2012/0259638 A1* | 10/2012 | Kalinli | G10L 15/25 704/270 |
| 2012/0320100 A1* | 12/2012 | Machida | G02B 27/017 345/690 |
| 2013/0088413 A1 | 4/2013 | Raffle et al. | |
| 2013/0120224 A1 | 5/2013 | Cajigas et al. | |
| 2013/0187943 A1* | 7/2013 | Bohn | H04N 13/0425 345/619 |
| 2014/0035906 A1* | 2/2014 | Ranjan | G06T 15/00 345/419 |
| 2014/0198977 A1 | 7/2014 | Narasimha et al. | |
| 2014/0285494 A1* | 9/2014 | Jo | G09G 5/24 345/471 |
| 2015/0187224 A1* | 7/2015 | Moncrief | G09B 9/052 434/30 |
| 2015/0358613 A1* | 12/2015 | Sandrew | G06T 15/205 348/36 |
| 2016/0239082 A1* | 8/2016 | Takano | G06F 3/005 |
| 2016/0284129 A1* | 9/2016 | Nishizawa | G06F 3/013 |
| 2016/0320623 A1* | 11/2016 | Miyao | G02B 27/0172 |
| 2016/0370592 A1* | 12/2016 | Mak | G02B 27/00 |
| 2016/0378111 A1* | 12/2016 | Lenser | G05D 1/0251 701/2 |
| 2017/0166222 A1* | 6/2017 | James | B60W 50/14 |

FOREIGN PATENT DOCUMENTS

| | | |
|---|---|---|
| WO | 2012177657 A2 | 12/2012 |
| WO | 2013082387 A1 | 6/2013 |

OTHER PUBLICATIONS

State, et al., "Superior Augmented Reality Registration by Integrating Landmark Tracking and Magnetic Tracking", In Proceedings of the 23rd annual conference on Computer graphics and interactive techniques, Aug. 1, 1996, 10 pages.

* cited by examiner

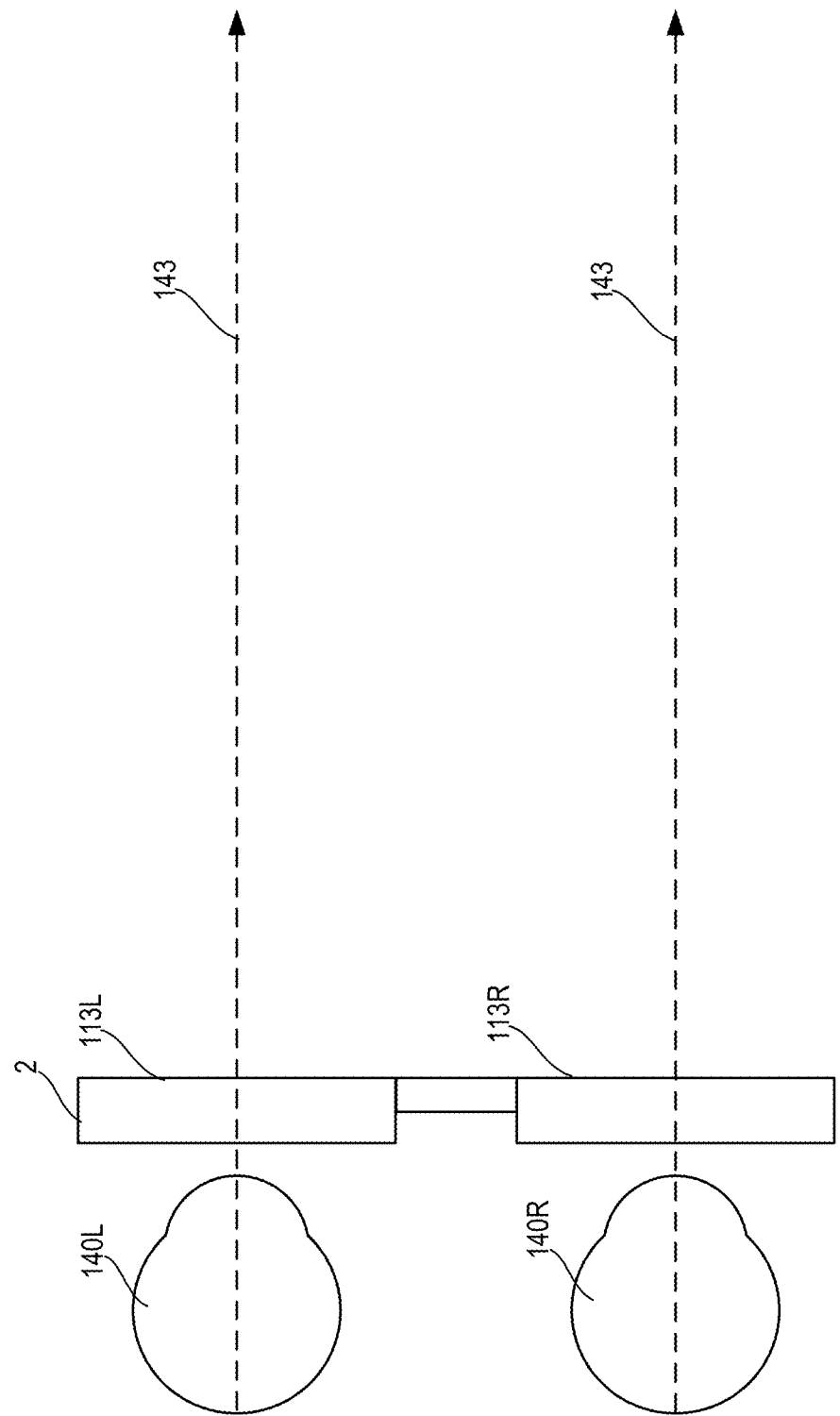

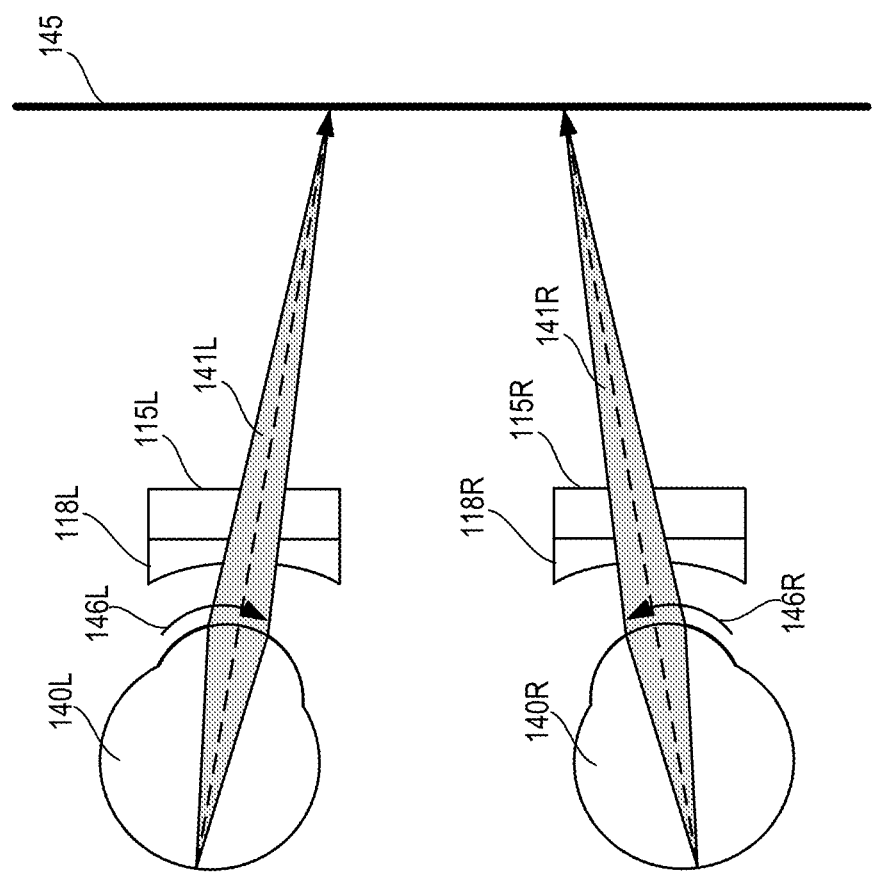

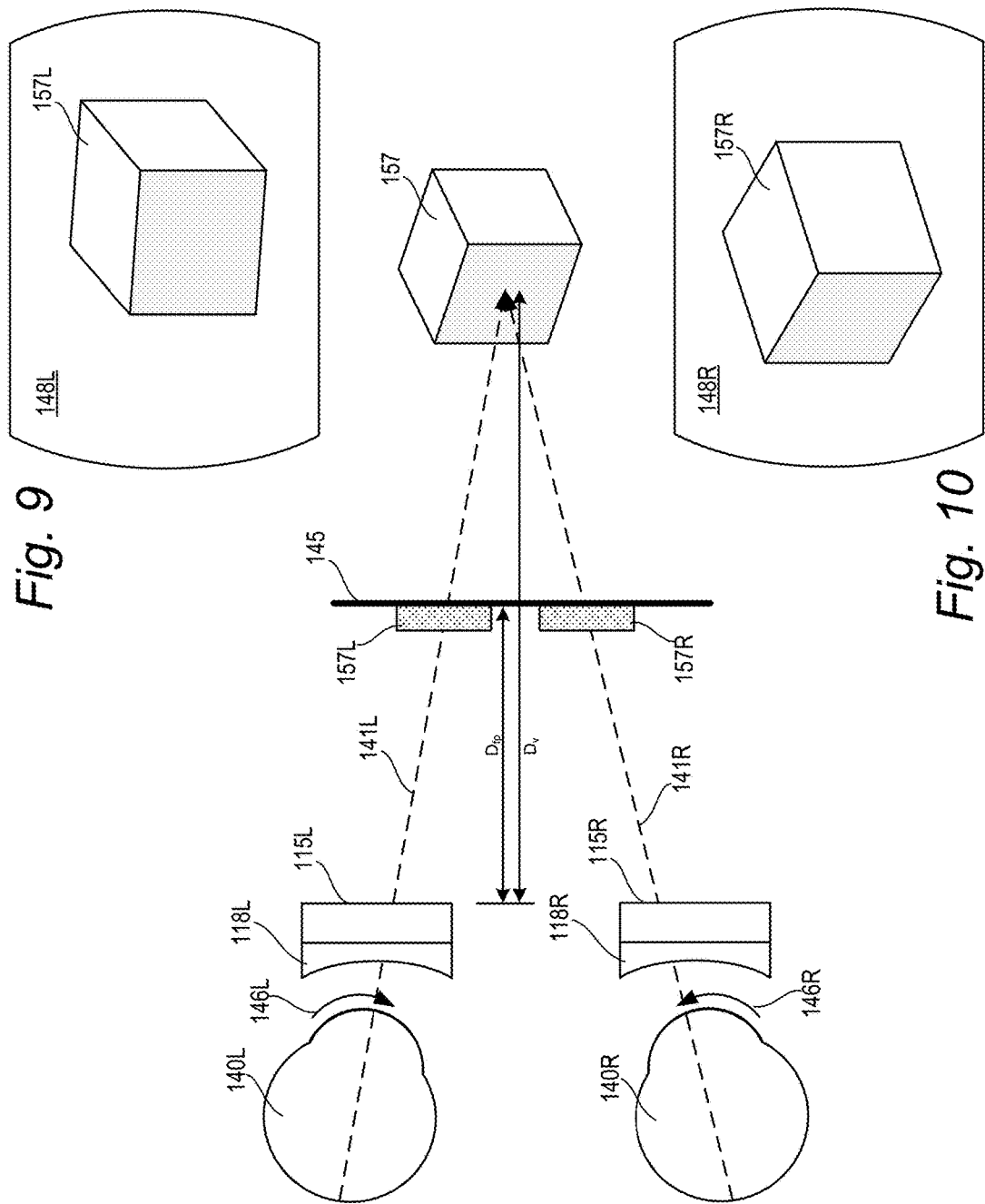

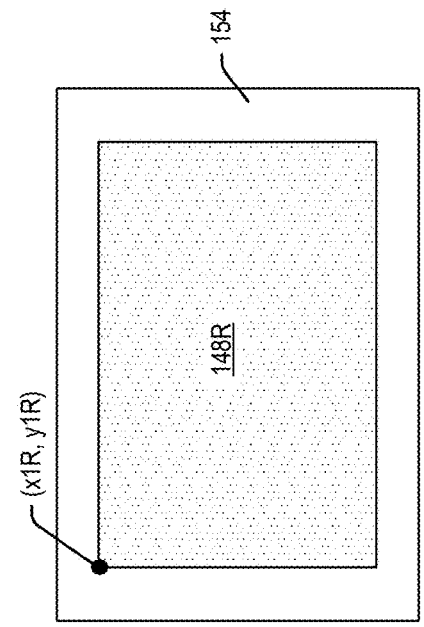
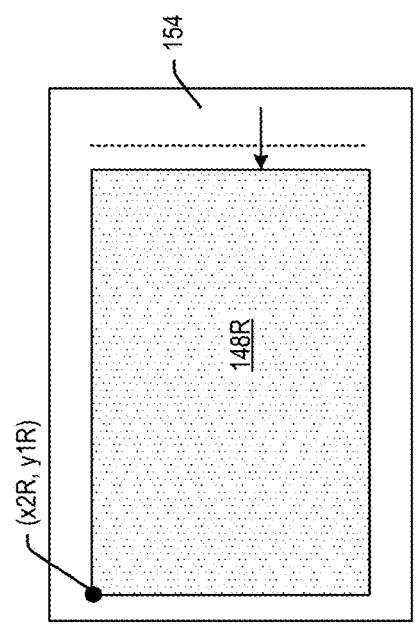
Fig. 14
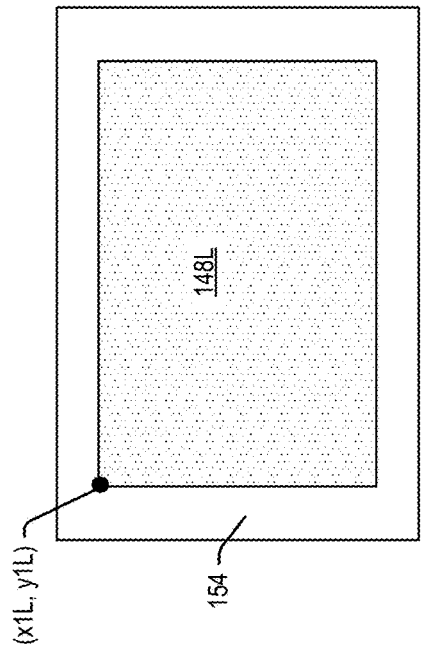
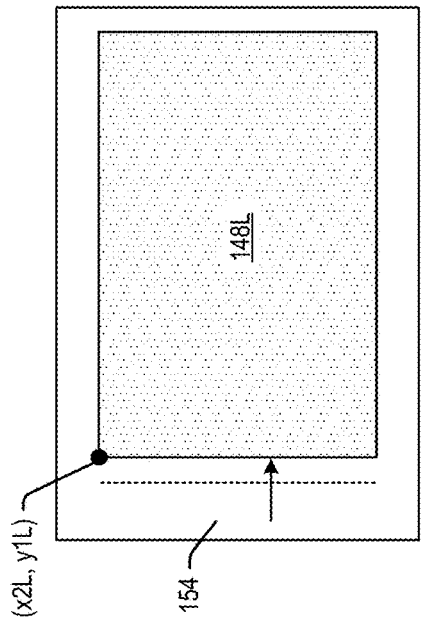
Fig. 15

*(Step 614)*

AR DISPLAY WITH ADJUSTABLE STEREO OVERLAP ZONE

BACKGROUND

Augmented reality is a technology that allows virtual imagery to be mixed with a real-world physical environment. A see-through, head mounted display device may be worn by a user to view the mixed imagery of real objects and virtual objects displayed in the user's field of view. In examples, microdisplays for both the left and right eyes project images including virtual objects into left and right optical lens assemblies. The optical lens assemblies then project the images into the left and right eyes. By providing the two images with binocular disparity, the head mounted displays can create a stereopsis effect where the virtual images appear three-dimensional at varying depths.

Given the spacing between the left and right optical lens assemblies, a horizontal stereo overlap of the left and right displayed images varies with a distance away from the lens assemblies. Lens assemblies may be configured to have complete image overlap at a given focal distance (for example at infinity), but this results in incomplete image overlap at other focal distances. Incomplete image overlap can have some disturbing visual effects, such as dim bands at the horizontal edges and possible a reduced stereopsis effect.

SUMMARY

Embodiments of the present technology relate to a system and method for presenting three-dimensional virtual objects within an augmented reality environment. A system for creating virtual objects in general includes a see-through, head mounted display device coupled to at least one processing unit. The head mounted display device includes a pair of microdisplays and optical lens assemblies, one each for the left and right eyes, for presenting images to the left and right eyes with stereopsis effect.

A focal distance of the left and right lens assemblies may be set to a predefined position during manufacture, such as for example 2 meters from the lens assemblies. Thereafter, an algorithm may shift the pixels at which the microdisplays project the left and right images to provide stereo overlap of the left and right images at the focal distance. The microdisplays may be provided with spare, generally unused pixels at a border of the display for use when shifting the displayed left and right images.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 6 is a top view of a pair of optical lens assemblies having a boresight focused at infinity.

FIG. 7 is a top view of a pair of optical lens assemblies focusing left and right images at a focal plane.

FIG. 8 is a top view of a pair of optical lens assemblies displaying a virtual object.

FIG. 9 is a view of a left image used to generate the virtual object displayed in FIG. 8.

FIG. 10 is a view of a right image used to generate the virtual object displayed in FIG. 8.

FIG. 14 illustrates left and right fields of active pixels, including pixels for displaying the left and right image, and a border of pixels around the pixels used to display the left and right images.

FIG. 15 illustrates left and right fields of active pixels, including pixels for displaying the left and right image which have been shifted into the border of pixels around.

DETAILED DESCRIPTION

Embodiments of the present technology will now be described with reference to the figures, which in general relate to a system and method for controlling the overlap of images displayed to the left and right eyes in an augmented reality system. In embodiments, the system and method may use a mobile augmented reality assembly to generate a three-dimensional augmented reality environment. The augmented reality assembly includes a mobile processing unit coupled to a head mounted display device (or other suitable apparatus) having left and right microdisplays and optical lens assemblies.

The lens assemblies are to a degree transparent so that a user can look through the lens assemblies at real world objects within the user's field of view (FOV). The microdisplays and lens assemblies also provide the ability to project virtual images into the FOV of the user such that the virtual images may also appear alongside the real world objects. The system automatically tracks where the user is looking so that the system can determine where to insert a virtual image in the FOV of the user. Once the system knows where to project the virtual image, the image is projected to the left and right eyes with binocular disparity to create 3D virtual objects alongside real world objects.

The lens assemblies may be configured with a particular focal distance, which is the distance at which the left optical lens assembly focuses images, and the distance at which the right optical lens assembly focuses images. A focal plane 2 meters in front of the head mounted display device is one example providing a minimum of eye strain. As noted in the Background section, given the spacing and relative orientation of the respective left and right optical lens assemblies, the stereo horizontal overlap of the left and right images will vary with a distance away from the lens assemblies. In accordance with aspects of the present technology, the displayed positions of the left and right images may be controlled using an algorithm, referred to herein as a display shift algorithm, for maximum horizontal stereo overlap at a desired depth, for example at the configured focal distance. It is also contemplated that the vertical stereo overlap of the left and right images be controlled with the display shift algorithm. The optical lens assemblies and the operation of the display shift algorithm are explained below.

Figure 1:
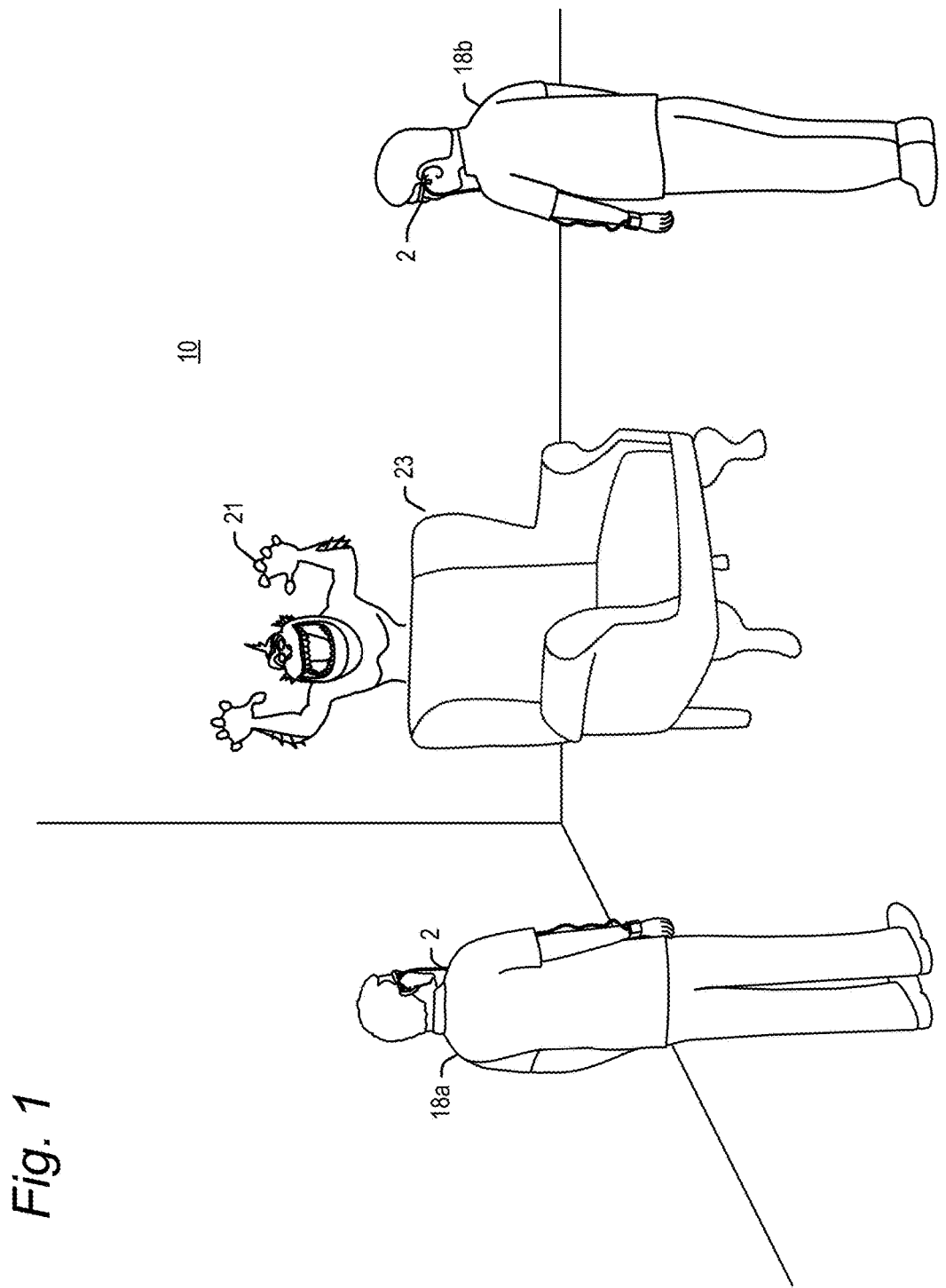
FIG. 1 is an illustration of a virtual reality environment including real and virtual objects.

FIG. 1 illustrates an augmented reality environment 10 for providing an augmented reality experience to users by fusing virtual content 21 with real content 23 within each user's FOV. FIG. 1 shows two users 18a and 18b, each wearing a head mounted display device 2, and each viewing the virtual content 21 adjusted to their perspective. It is understood that the particular virtual content shown in FIG. 1 is by way of example only, and may be any of a wide variety of virtual objects.

Figure 2:
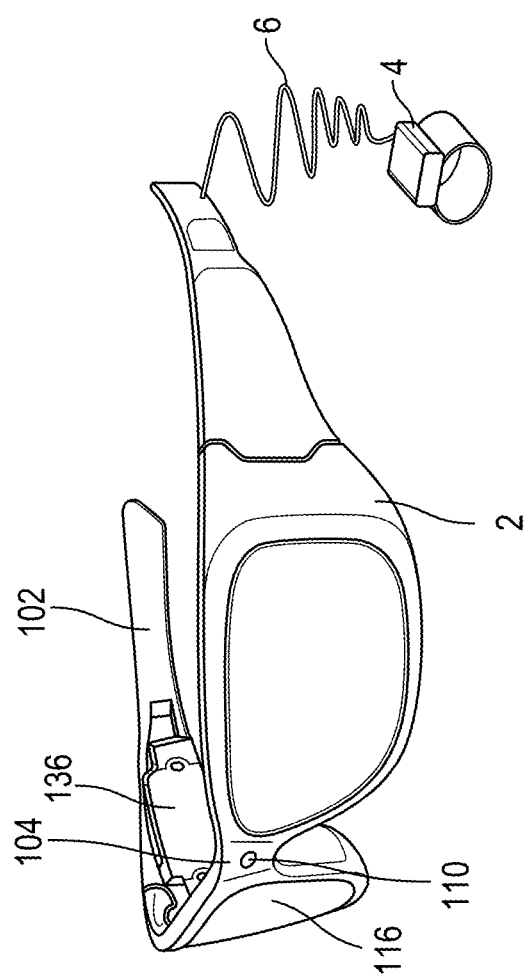
FIG. 2 is a perspective view of one embodiment of ahead mounted display unit.

As shown in FIG. 2, each head mounted display device 2 may include or be in communication with its own processing unit 4, for example via a flexible wire 6. The head mounted display device may alternatively communicate wirelessly with the processing unit 4. In further embodiments, the processing unit 4 may be integrated into the head mounted display device 2. Head mounted display device 2, which in one embodiment is in the shape of glasses, is worn on the head of a user so that the user can see through a display and thereby have an actual direct view of the space in front of the user. More details of the head mounted display device 2 and processing unit 4 are provided below.

Where not incorporated into the head mounted display device 2, the processing unit 4 may be a small, portable device for example worn on the user's wrist or stored within a user's pocket. The processing unit 4 may include hardware components and/or software components to execute applications such as gaming applications, non-gaming applications, or the like. In one embodiment, processing unit 4 may include a processor such as a standardized processor, a specialized processor, a microprocessor, or the like that may execute instructions stored on a processor readable storage device for performing the processes described herein. In embodiments, the processing unit 4 may communicate wirelessly (e.g., WiFi, Bluetooth, infra-red, or other wireless communication means) to one or more remote computing systems. These remote computing systems may including a computer, a gaming system or console, or a remote service provider.

The head mounted display device 2 and processing unit 4 may cooperate with each other to present virtual objects 21 to a user in an augmented reality environment 10. The details of the mobile head mounted display device 2 and processing unit 4 which enable the building of virtual objects will now be explained with reference to FIGS. 2-6.

Figure 3:
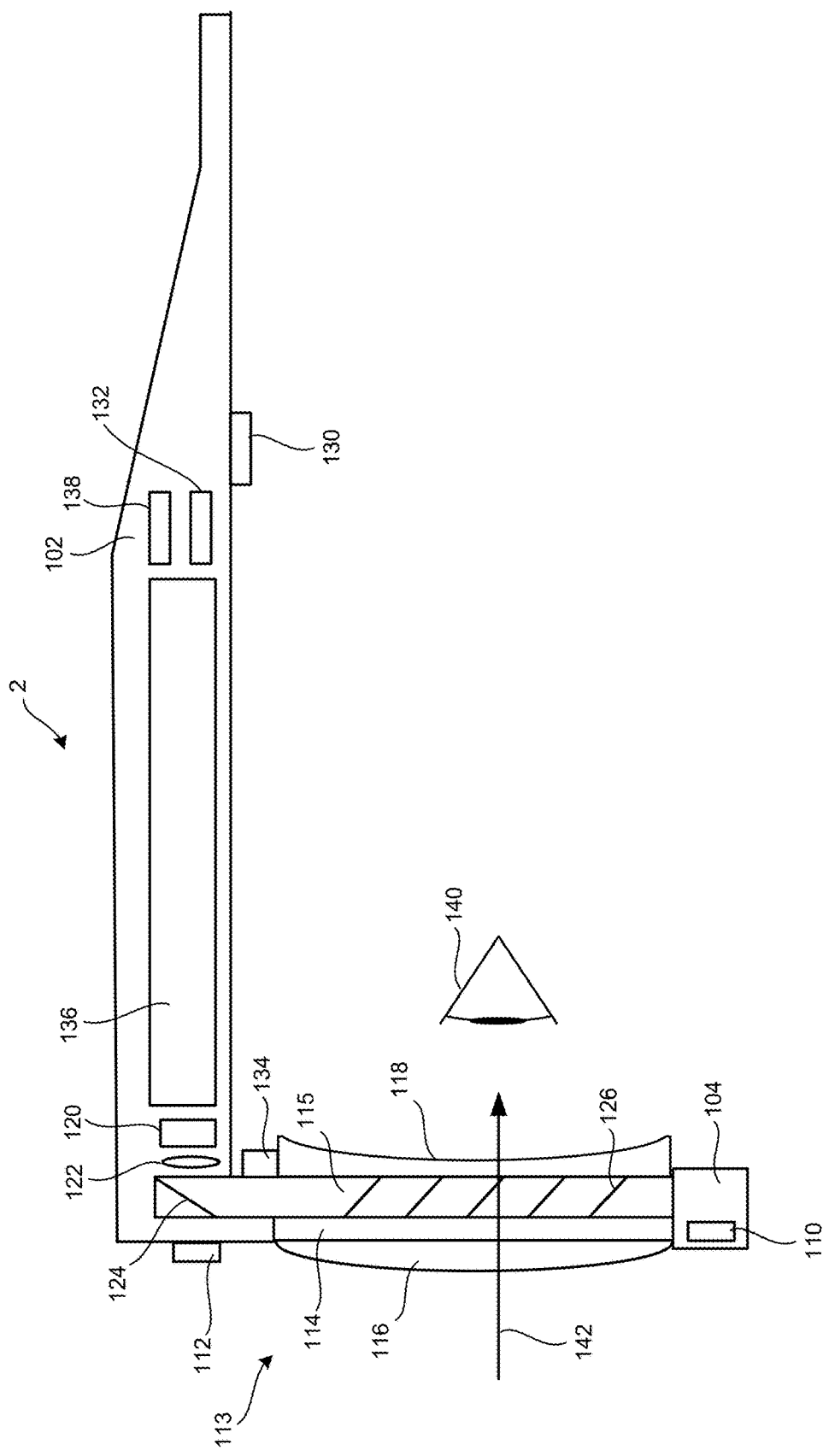
FIG. 3 is a side view of a portion of one embodiment of a head mounted display unit.

FIGS. 2 and 3 show perspective and side views of the head mounted display device 2. FIG. 3 shows only the right side of head mounted display device 2, including a portion of the device having temple 102 and nose bridge 104. Built into nose bridge 104 is a microphone 110 for recording sounds and transmitting that audio data to processing unit 4, as described below. At the front of head mounted display device 2 is room-facing video camera 112 that can capture video and still images. Those images are transmitted to processing unit 4, as described below.

A portion of the frame of head mounted display device 2 will surround a display that includes a pair of lens assemblies, each including one or more lenses. In order to show the components of head mounted display device 2, a portion of the frame surrounding the display is not depicted. The display includes a pair of optical lens assemblies 113 (one of which is seen in FIG. 3) including a light-guide optical element 115, opacity filter 114, see-through lens 116 and a focal plane lens 118. The left and right focal plane lenses 118 (one of which is seen in FIG. 3) may be behind and aligned with light-guide optical element 115. The focal plane lenses 118 may be negatively or concavely shaped to focus light received from the light-guide optical element 115 at focal distance at some predefined distance in front of the optical lens assembly 113 as explained below.

In one embodiment, opacity filter 114 is behind and aligned with see-through lens 116. Opacity filter 114, which is aligned with light-guide optical element 115, selectively blocks natural light, either uniformly or on a per-pixel basis, from passing through light-guide optical element 115. Details of an example of opacity filter 114 are provided in U.S. Patent Publication No. 2012/0068913 to Bar-Zeev et al., entitled "Opacity Filter For See-Through Mounted Display," filed on Sep. 21, 2010.

In one embodiment, light-guide optical element 115 is behind and aligned with opacity filter 114. Light-guide optical element 115 transmits light from microdisplay 120 to the eye 140 of the user wearing head mounted display device 2. Light-guide optical element 115 also allows light from in front of the head mounted display device 2 to be transmitted through light-guide optical element 115 to eye 140, as depicted by arrow 142, thereby allowing the user to have an actual direct view of the space in front of head mounted display device 2 in addition to receiving a virtual image from microdisplay 120. Thus, the walls of light-guide optical element 115 are see-through.

Light-guide optical element 115 includes a first reflecting surface 124 (e.g., a mirror or other surface). Light from microdisplay 120 passes through lens 122 and becomes incident on reflecting surface 124. The reflecting surface 124 reflects the incident light from the microdisplay 120 such that light is trapped inside a planar substrate comprising light-guide optical element 115 by internal reflection. After several reflections off the surfaces of the substrate, the trapped light waves reach an array of selectively reflecting surfaces 126. Note that only one of the five surfaces is labeled 126 to prevent over-crowding of the drawing. Reflecting surfaces 126 couple the light waves incident upon those reflecting surfaces out of the substrate into the eye 140 of the user.

As different light rays will travel and bounce off the inside of the substrate at different angles, the different rays will hit the various reflecting surfaces 126 at different angles. Therefore, different light rays will be reflected out of the substrate by different ones of the reflecting surfaces. The selection of which light rays will be reflected out of the substrate by which surface 126 is engineered by selecting an appropriate angle of the surfaces 126. More details of a light-guide optical element can be found in United States Patent Publication No. 2008/0285140, entitled "Substrate-Guided Optical Devices," published on Nov. 20, 2008. In one embodiment, each eye will have its own light-guide optical element 115. When the head mounted display device 2 has two light-guide optical elements, each eye can have its own microdisplay 120 that can display the same image in both eyes or different images in the two eyes. In another embodiment, there can be one light-guide optical element which reflects light into both eyes.

Mounted to or inside temple 102 is an image source, which (in one embodiment) includes microdisplay 120 for projecting a virtual image and lens 122 for directing images from microdisplay 120 into the optical lens assembly 113. In one embodiment, lens 122 is a collimating lens. Microdisplay 120 projects an image through lens 122. There are different image generation technologies that can be used to implement microdisplay 120. For example, microdisplay 120 can be implemented in using an OLED (Organic Light Emitting Diode) array, which is a self-emitting type of spatial color microdisplay. Additionally, microdisplay 120 can be implemented using a set of RGB light emitters and a scanning technology. For example, a PicoP™ display engine from Microvision, Inc. emits RGB laser signals with a micro mirror steering either onto a tiny screen that acts as a transmissive element or beamed directly into the eye.

Microdisplay 120 can also be implemented using a reflective technology for which external light is reflected and modulated by an optically active material. The illumination is provided by either a white source or RGB source, depending on the technology. Digital light processing (DLP), liquid crystal on silicon (LCOS) and Mirasol® display technology from Qualcomm, Inc. are examples of reflective display technologies which are efficient as most energy is reflected away from the modulated structure and may be used in the present system. Additionally, microdisplay 120 can be a transmissive projection technology where the light source is modulated by optically active material, backlit with white light. These technologies are usually implemented using LCD type displays with powerful backlights and high optical energy densities.

Control circuits 136 provide various electronics that support the other components of head mounted display device 2. More details of control circuits 136 are provided below with respect to FIG. 4. Inside or mounted to temple 102 are ear phones 130, inertial measurement unit 132 and temperature sensor 138. In one embodiment shown in FIG. 4, the inertial measurement unit 132 (or IMU 132) includes inertial sensors such as a three axis magnetometer 132A, three axis gyro 132B and three axis accelerometer 132C. The inertial measurement unit 132 senses position, orientation, and sudden accelerations (pitch, roll and yaw) of head mounted display device 2. The IMU 132 may include other inertial sensors in addition to or instead of magnetometer 132A, gyro 132B and accelerometer 132C.

Head mounted display device 2 also includes a system for tracking the position of the user's eyes. The system may track the user's eye position and orientation so that the system can determine the FOV of the user. However, a human will not perceive everything in front of them. Instead, a user's eyes will be directed at a subset of the environment. Therefore, in one embodiment, the system may include technology for tracking the position of the user's eyes in order to refine the measurement of the FOV of the user.

Figure 4:
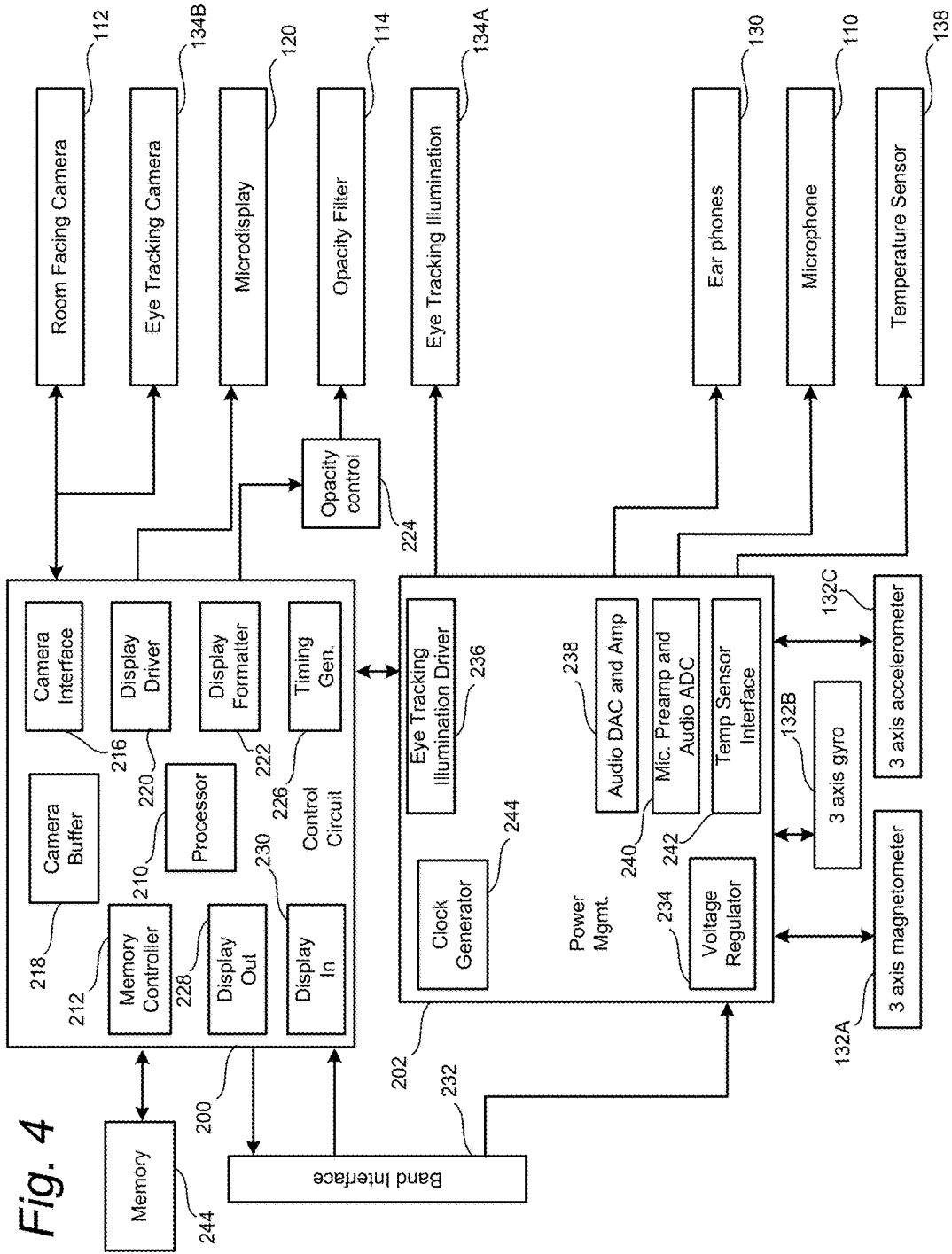
FIG. 4 is a block diagram of one embodiment of the components of a head mounted display unit.

For example, head mounted display device 2 may include eye tracking assembly 134 (FIG. 3), which has an eye tracking illumination device 134A and eye tracking camera 134B (FIG. 4). In one embodiment, eye tracking illumination device 134A includes one or more infrared (IR) emitters, which emit IR light toward the eye. Eye tracking camera 134B includes one or more cameras that sense the reflected IR light. The position of the pupil can be identified by known imaging techniques which detect the reflection of the cornea. For example, see U.S. Pat. No. 7,401,920, entitled "Head Mounted Eye Tracking and Display System", issued Jul. 22, 2008. Such a technique can locate a position of the center of the eye relative to the tracking camera. Generally, eye tracking involves obtaining an image of the eye and using computer vision techniques to determine the location of the pupil within the eye socket. In one embodiment, it is sufficient to track the location of one eye since the eyes usually move in unison. However, it is possible to track each eye separately. Other eye tracking technologies are possible.

FIG. 3 only shows half of the head mounted display device 2. A full head mounted display device may include another optical lens assembly 113, another microdisplay 120, another lens 122, room-facing camera 112, eye tracking assembly 134, earphones, and temperature sensor.

Figure 5:
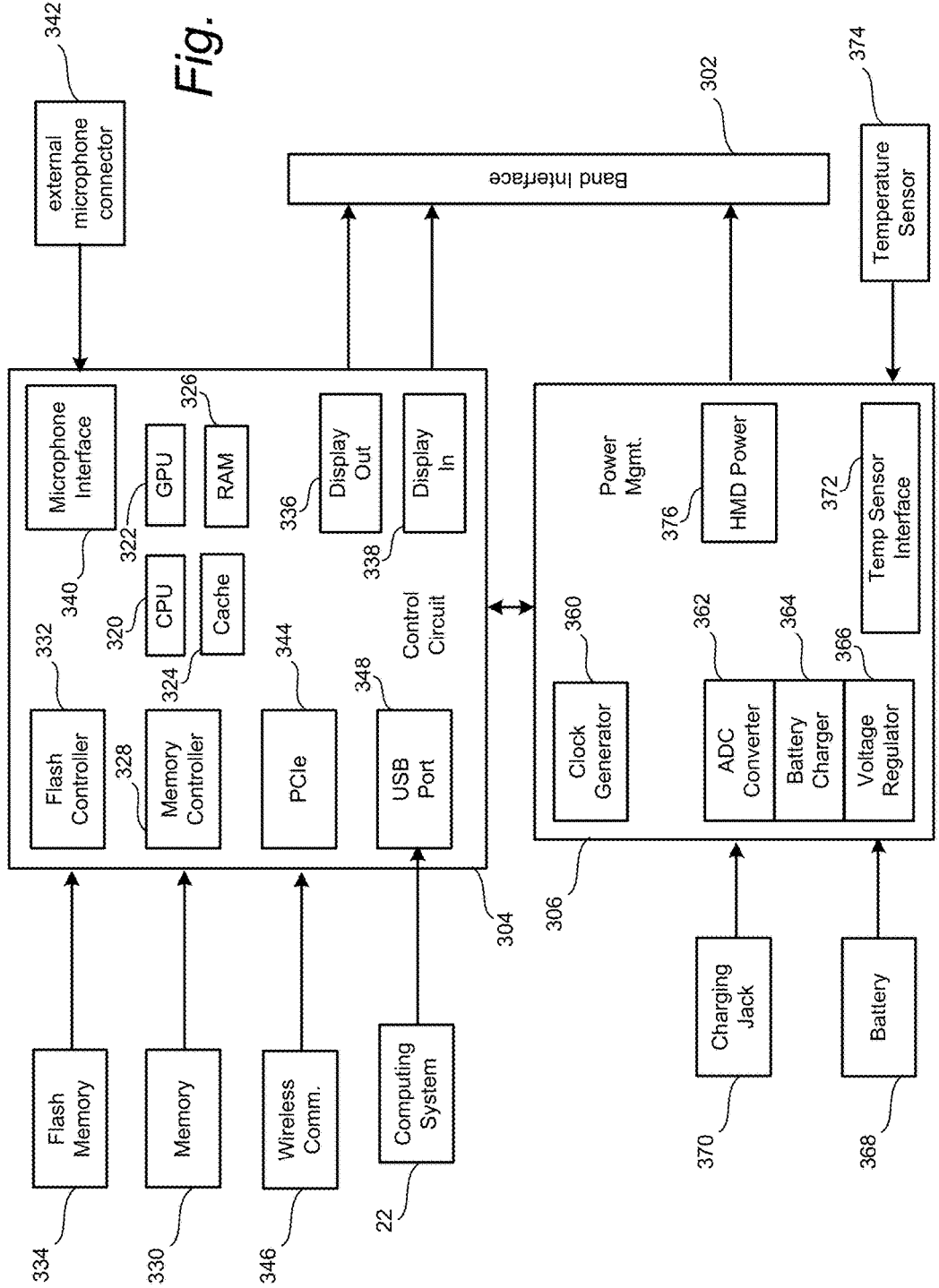
FIG. 5 is a block diagram of one embodiment of the components of a processing unit associated with a head mounted display unit.

FIG. 4 is a block diagram depicting the various components of head mounted display device 2. FIG. 5 is a block diagram describing the various components of processing unit 4. Head mounted display device 2, the components of which are depicted in FIG. 4, is used to provide a virtual experience to the user by fusing one or more virtual images seamlessly with the user's view of the real world. Additionally, the head mounted display device components of FIG. 4 include many sensors that track various conditions. Head mounted display device 2 will receive instructions about the virtual image from processing unit 4 and will provide the sensor information back to processing unit 4. Processing unit 4 may determine where and when to provide a virtual image to the user and send instructions accordingly to the head mounted display device of FIG. 4.

Some of the components of FIG. 4 (e.g., room-facing camera 112, eye tracking camera 134B, microdisplay 120, opacity filter 114, eye tracking illumination 134A, earphones 130, and temperature sensor 138) are shown in shadow to indicate that there are two of each of those devices, one for the left side and one for the right side of head mounted display device 2. FIG. 4 shows the control circuit 200 in communication with the power management circuit 202. Control circuit 200 includes processor 210, memory controller 212 in communication with memory 214 (e.g., D-RAM), camera interface 216, camera buffer 218, display driver 220, display formatter 222, timing generator 226, display out interface 228, and display in interface 230.

In one embodiment, the components of control circuit 200 are in communication with each other via dedicated lines or one or more buses. In another embodiment, the components of control circuit 200 is in communication with processor 210. Camera interface 216 provides an interface to the two room-facing cameras 112 and stores images received from the room-facing cameras in camera buffer 218. Display driver 220 will drive microdisplay 120. Display formatter 222 provides information, about the virtual image being displayed on microdisplay 120, to opacity control circuit 224, which controls opacity filter 114. Timing generator 226 is used to provide timing data for the system. Display out interface 228 is a buffer for providing images from room-facing cameras 112 to the processing unit 4. Display in interface 230 is a buffer for receiving images such as a virtual image to be displayed on microdisplay 120. Display out interface 228 and display in interface 230 communicate with band interface 232 which is an interface to processing unit 4.

Power management circuit 202 includes voltage regulator 234, eye tracking illumination driver 236, audio DAC and amplifier 238, microphone preamplifier and audio ADC 240, temperature sensor interface 242 and clock generator 244. Voltage regulator 234 receives power from processing unit 4 via band interface 232 and provides that power to the other components of head mounted display device 2. Eye tracking illumination driver 236 provides the IR light source for eye tracking illumination 134A, as described above. Audio DAC and amplifier 238 output audio information to the earphones 130. Microphone preamplifier and audio ADC 240 provides an interface for microphone 110. Temperature sensor interface 242 is an interface for temperature sensor 138. Power management circuit 202 also provides power and receives data back from three axis magnetometer 132A, three axis gyro 132B and three axis accelerometer 132C.

FIG. 5 is a block diagram describing the various components of processing unit 4. FIG. 5 shows control circuit 304 in communication with power management circuit 306. Control circuit 304 includes a central processing unit (CPU) 320, graphics processing unit (GPU) 322, cache 324, RAM 326, memory controller 328 in communication with memory 330 (e.g., D-RAM), flash memory controller 332 in communication with flash memory 334 (or other type of non-volatile storage), display out buffer 336 in communication with head mounted display device 2 via band interface 302 and band interface 232, display in buffer 338 in communication with head mounted display device 2 via band interface 302 and band interface 232, microphone interface 340 in communication with an external microphone connector 342 for connecting to a microphone, PCI express interface for connecting to a wireless communication device 346, and USB port(s) 348. In one embodiment, wireless communication device 346 can include a Wi-Fi enabled communication device, BlueTooth communication device, infrared communication device, etc. The USB port can be used to dock the processing unit 4 to computing system 22 in order to load data or software onto processing unit 4, as well as charge processing unit 4. In one embodiment, CPU 320 and GPU 322 are the main workhorses for determining where, when and how to insert virtual three-dimensional objects into the view of the user. More details are provided below.

Power management circuit 306 includes clock generator 360, analog to digital converter 362, battery charger 364, voltage regulator 366, head mounted display power source 376, and temperature sensor interface 372 in communication with temperature sensor 374 (possibly located on the wrist band of processing unit 4). Analog to digital converter 362 is used to monitor the battery voltage, the temperature sensor and control the battery charging function. Voltage regulator 366 is in communication with battery 368 for supplying power to the system. Battery charger 364 is used to charge battery 368 (via voltage regulator 366) upon receiving power from charging jack 370. HMD power source 376 provides power to the head mounted display device 2.

FIG. 6 illustrates the alignment of the left and right optical lens assemblies 113L and 113R to each other and relative to the interpupillary distance (IPD) of a user's left and right eyes 140L and 140R. During manufacture of the head mounted display device 2, the alignment, or boresight, of the lens assemblies 113L and 113R may be set relative to each other. In embodiments, the boresight of lens assemblies 113L and 113R may be selected so that planar surfaces of the lens assemblies 113L and 113R are parallel to each other, and rays 143 extending perpendicularly from the planar surfaces of lens assemblies 113L and 113R extend to infinity without intersecting. It is understood that the boresight of lens assemblies 113L and 113R may be other than parallel to each other in further embodiments, for example so that rays 143 verge toward each other.

The lens assemblies 113L and 113R are also spaced from each other a distance equal to the IPD of most users, so that centers of the lens assemblies 113L and 113R aligns with centers of a user's eyes. IPD varies among users, for example between 50 mm and 75 mm. Thus, the lens assemblies 113L and 113R may be spaced from each other, center-to-center somewhere within this range.

Another optical property of the optical lens assemblies 113L and 113R that is set during manufacture of the head mounted display device 2 is the focal distance of the lens assemblies 113L and 113R. FIG. 7 shows the light-guide optical element 115L, 115R and focal plane lens 118L, 118R of the respective lens assemblies 113L and 113R. In the left optical lens assembly 113L, light rays 141L received from the light-guide optical element 115L are redirected by the focal plane lens 118L so as to appear to the eye 140L of the user to come to a focus at a focal plane 145. Within tolerances, the right optical lens assembly 113R is configured to focus images at the same focal plane 145.

Images from the left and right microdisplays may contain virtual objects which, when processed by the brain, appear to exist at different depths relative to the head mounted display device 2 (in front of or behind the focal plane 145). However, the image including all virtual objects created by the left microdisplay and directed by focal plane lens 118L focuses at the focal plane 145. The same is true for the image created by the right microdisplay and directed by the focal plane lens 118R. Different virtual depths are created by where the left and right virtual objects converge relative to the focal plane, controlled by binocular disparity of the virtual objects displayed by the left and right microdisplays.

For example, the light rays 141L and 141R in FIG. 7 cause the user's eyes to converge inward in the directions of arrows 146L and 146R, respectively, to focus on the objects on focal plane 145. As shown in FIG. 8, when combined with the binocular disparity between the virtual objects displayed to the left and right eyes, the brain interprets the virtual object as existing at a given virtual depth, $D_v$, which in this example is farther than the distance to the focal plane, $D_{fp}$.

FIG. 8 illustrates a virtual object 157 (a virtual cube in this example). The virtual object 157 is generated from a display of a portion 157L of an image onto the focal plane 145 by the left microdisplay, and a display of a portion 157R of an image onto the focal plane by the right microdisplay. The portions 157L and 157R are shown as having depth on the focal plane 145 so they can be seen, but they would in fact be flat on the focal plane and not visible in FIG. 8. FIG. 9 illustrates the left image 148L from the left microdisplay including the portion 157L, and FIG. 10 illustrates the right image 148R from the right microdisplay including the portion 157R. FIG. 8 contains only portions 157L/R of images 148L/R. As discussed below, the entire images 148L/R would overlap each other as explained below.

Figure 11:
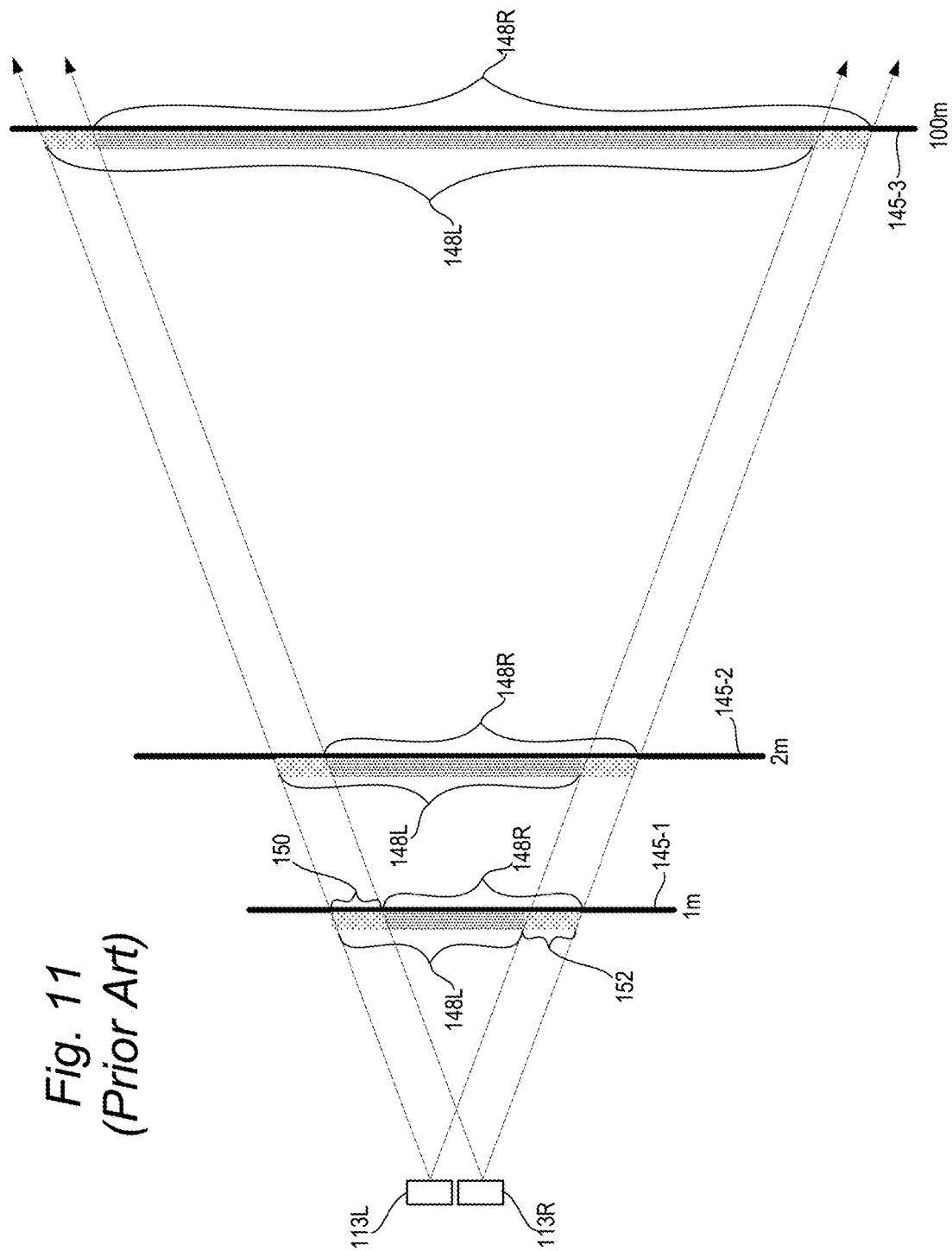
FIG. 11 is a conventional top view of a pair optical lens assemblies displaying left and right images partially overlapped at a number of focal distances.

FIG. 11 is an illustration of left and right images 148L and 148R conventionally displayed at different focal distances. In examples, the left and right images 148L and 148R both project outward horizontally. As can be seen, the spatial extent of displayed images 148L, 148R gets larger the further the image focal plane is from the head mounted display device 2. This example mirrors the example shown in FIG. 6, where the boresight of the optical lens assemblies 113L and 113R extend in parallel rays out to infinity. Thus, the outer extents of the horizontal angles run parallel to each other. Where the boresight extends in non-parallel rays, the outer extents of the left and right images would also be non-parallel with respect to each other.

Figure 12:
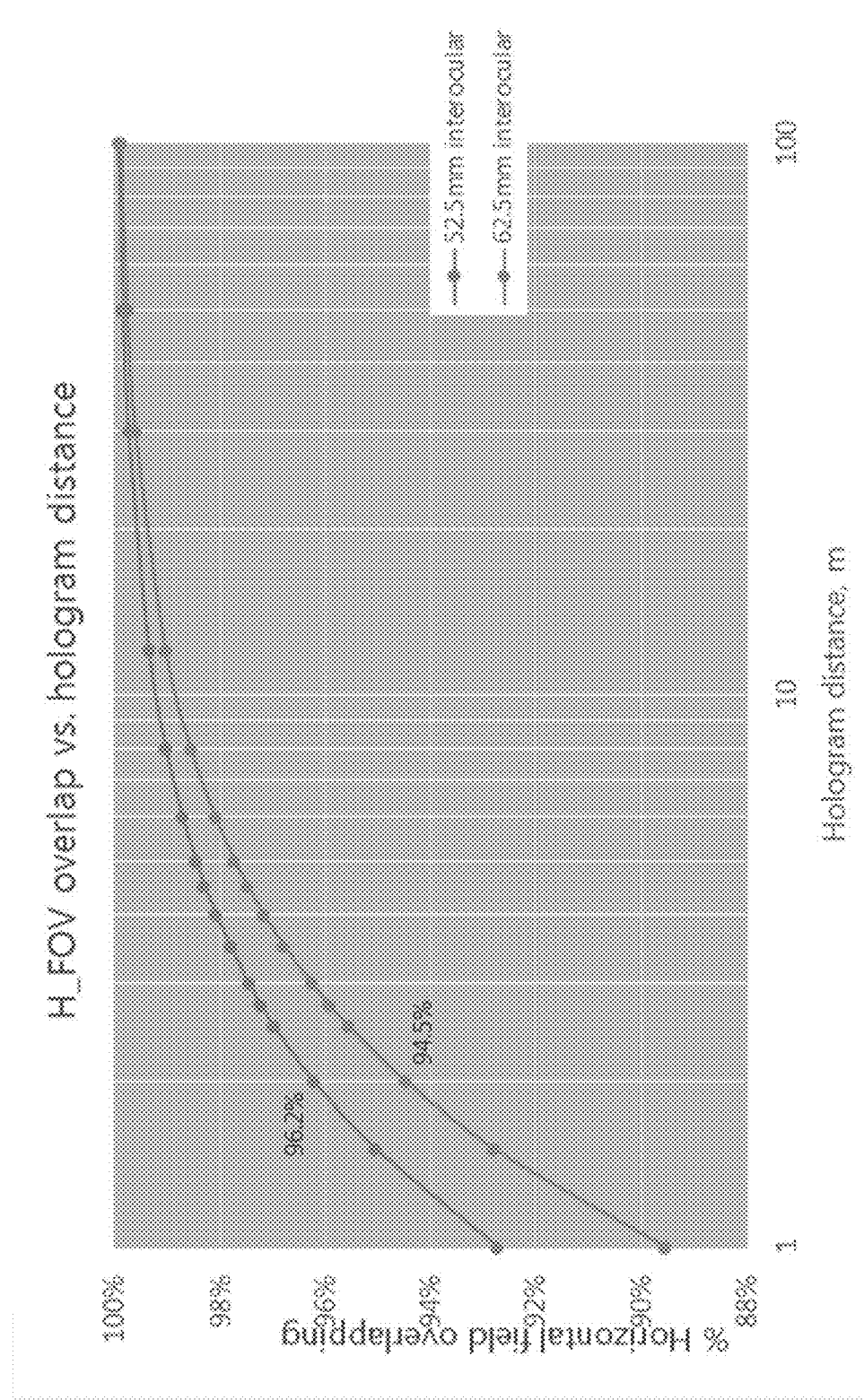
FIG. 12 is a conventional graph of an amount of horizontal overlap versus distance for two different interocular distances.

As can be seen in FIG. 11, the images 148L and 148R overlap each other (shown with a darker area in FIG. 11). A first side band 150 exists including the left image 148L but not right image 148R, and a second side band 152 exists including the right image 148R but not left image 148L. The combined 3D image tends to display more dimly in the side bands 150 and 152, and the side bands can also interfere with the stereopsis effect of 3D images.

Where boresight is set to infinity, the bands 150 and 152 have little or no effect on the displayed images at large distances. That is because the side bands have a constant width (in this example), but at large distances, the overlap area becomes comparatively quite large. For example, focal plane 145-3 is set at 100 meters. At this distance, the overlap of the left and right images 148L and 148R is above 99%. However, at closer distances in this example, the amount of overlap decreases. At 2 m, the left and right images 148L, 148R focused on focal plane 145-2 have an overlap determined to be about 94.5%. And at 1 m, the left and right images 148L, 148R focused on focal plane 145-1 have an overlap determined to be about 89.4%. FIG. 12 is a conventional graph of the amount of horizontal overlap versus distance for two different interocular distances (52.5 mm and 62.5 mm). As can be seen, at small distances, the amount of overlap decreases and the side bands 150 and 152 where the images do not overlap become large relative to the overlapped sections.

In accordance with aspects of the present technology, the overlap of the left and right images 148L and 148R may be shifted toward each other to have complete or substantially complete overlap at some predefined distance from the head mounted display assembly. This predefined distance may be the focal distance but need not be in further embodiments.

In embodiments, the display shift algorithm for shifting of the left and right images 148L and 148R may be performed in a one-time calibration process during manufacture of the head mounted display device 2. However, in addition to or instead of the manufacturing calibration process, the present technology may implement the display shift algorithm dynamically in the runtime rendering process during use of the head mounted display device 2. Implementations of the display shift algorithm as a one-time manufacturing calibration process and in the runtime rendering process are explained below.

Figure 13:
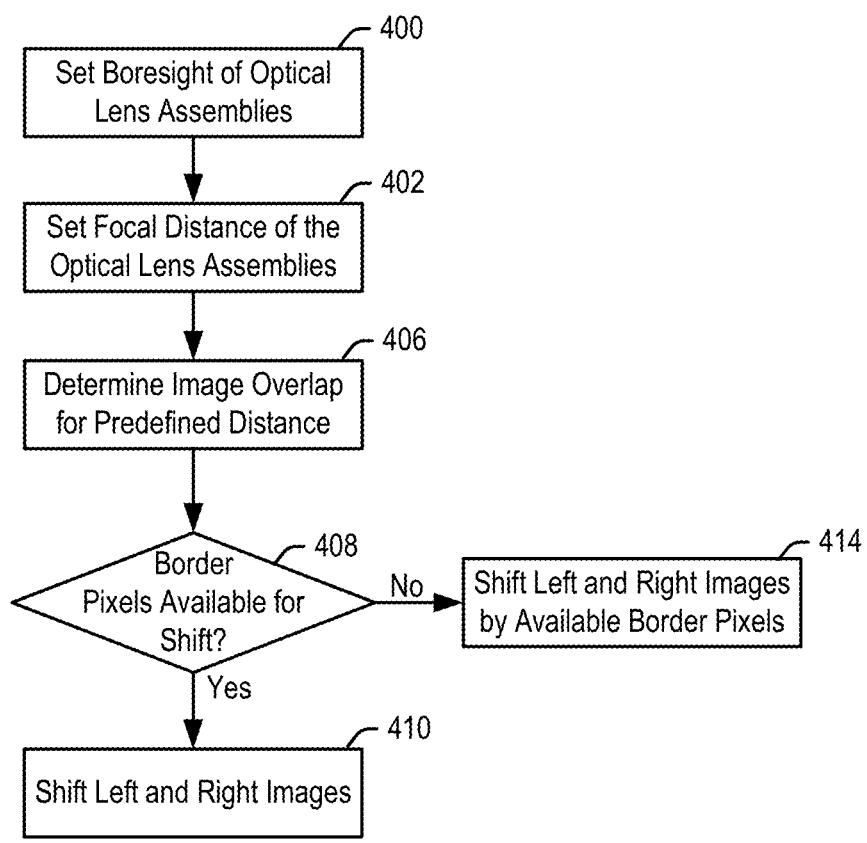
FIG. 13 is a flowchart illustrating the operation of embodiments of the present technology.

FIG. 13 illustrates a flowchart for implementing the display shift algorithm as a one-time calibration process during manufacture of the head mounted display device 2. In step 400, boresight of the respective optical lens assemblies 113L and 113R is set. Step 400 is performed during assembly and mounting of the optical lens assemblies into the head mounted display device.

In step 402, the focal distance for a predefined focal plane may be set. This focal distance may in fact be set when the optical lens assembly is configured and assembled, and as explained above, may at least in part be set by the concavity of the focus lenses 118L and 118R of the optical lens assemblies 113. The head mounted display device 2 may be manufactured with any predesigned focal distance. It has been determined that the eyes verge comfortably to a distance of 2 meters, and for general use embodiments, the focal distance may be manufactured into head mounted display device at 2 meters.

However, certain head mounted display devices may be manufactured for specialized applications. For example, some professions such as commercial and military airplane pilots focus on the horizon when flying. Head mounted displays manufactured for such specialized use may have their focal distance set at infinity. Other professions, such as surgeons, typically focus at distances shorter than 2 meters, for example 1 meter, when operating. Head mounted displays manufactured for such specialized use may have their focal distance set at 1 meter. Other focal distances are contemplated.

In step 406, the left and right image overlap may be determined for some desired, predefined distance. As noted, this distance may typically be the focal plane distance, but need not be in further embodiments. Also, the left and right image overlap may be the horizontal left and right image overlap. However, as noted below, the overlap may alternatively or additionally be the vertical left and right image overlap in further embodiments. As noted in the graph of FIG. 12, the horizontal stereo overlap of the left and right images is a known function of distance, depending on the spacing between the optical lens assemblies 113L and 113R, and on the boresight set for the optical lens assemblies 113L and 113R. Vertical overlap of the left and right images is also a known function of distance, depending on the parallelism of the respective optical lens assemblies about a horizontal axis through the lens assemblies.

The amount of horizontal and/or vertical image overlap in step 406 may be measured in pixels. As shown in FIG. 14, knowing the focal distance and boresight, a processor may determine the pixels where the left and right images are to be displayed by the left and right microdisplays 120. The processor may be processing unit 4, or some other processor used during manufacture of the head mounted display device 2. The left and images may each be the same size and may be a predefined number of rows and columns. In embodiments, the pixel display positions of the left and right images may be described in terms of an origin pixel. Different origin pixels may be used, but in embodiments, the origin pixel may be the pixel at the upper left of the displayed image pixel grid.

Thus, in FIG. 14, the origin pixel of the left image 148L is at pixel coordinate (x1L, y1L). The origin pixel of the right image 148R is at pixel coordinate (x1R, y1R). The degree of horizontal overlap correction of the left and right images is then given by the difference between x1L and x1R. By simple geometry, the angle subtended by each microdisplay pixel can be calculated. Then shifting each of the left and right images horizontally by the determined number of pixels would provide complete horizontal overlap of the left and right images. The shift direction is dependent on the orientation and design of the optics that follow the microdisplay, as is well known in the art of boresight alignment. Similarly, the degree of vertical overlap correction of the left and right images is then given by the difference between y1L and y1R. Shifting each of the left and right images vertically by the determined number of pixels can provide complete vertical overlap of the left and right images.

In step 408, the display shift algorithm determines whether there are available border pixels to make the horizontal and/or vertical shift. In particular, the pixels used for displaying the left and right images 148L, 148R (i.e., "active pixels") may be smaller than the overall field of pixels (i.e., "native pixels") available to the left and right microdisplays 120. As shown in FIG. 14, a border 154 of available pixels may be provided which are unused for the display of images 148L, 148R. In one example, the images 148L and 148R may use a grid of active pixels 1920 by 1080, where the overall field of native pixels may be 2000 by 1160. Thus, assuming the images 148L and 148R are initially centered in the field of native pixels, each image may shift horizontally and vertically:

$$\text{Shift}_{max\_h} = (2000-1920)/2 = 40 \text{ pixels}$$

$Shift_{max\_v} = (1160-1080)/2 = 40$ pixels.

It is understood that the above number of active and native pixels used for images 148L, 148R are by way of example only and the number of active and native pixels in the images may vary, proportionately or disproportionately, above or below these numbers in further examples. It is noted that both the left and right images 148L, 148R may shift, so the overall horizontal or vertical shift of the images relative to each other may be twice the maximum shift numbers set forth above.

Referring again to step 408, the display shift algorithm checks whether there are sufficient border pixels to shift the image horizontally and/or vertically the number of pixels determined in step 406 so that the images 148L and 148R completely overlap. If so, the image is shifted horizontally and/or vertically in step 410. As shown in FIG. 15, the images 148L and 148R may be shifted equal amounts horizontally, for example by resetting the origin pixel in the left image 148L from (x1L, y1L) to (x2L, y1L), and by resetting the origin pixel in the right image 148R from (x1R, y1R) to (x2R, y1R). It is understood that the origin pixels may be adjusted similarly for a vertical shift.

If, on the other hand, it is determined in step 408 that there are not enough pixels in the border 154 to shift an amount to complete the overlap of the left and right images, the images may be shifted in step 414 by the amount of pixels that are available in the border 154.

Figure 16:
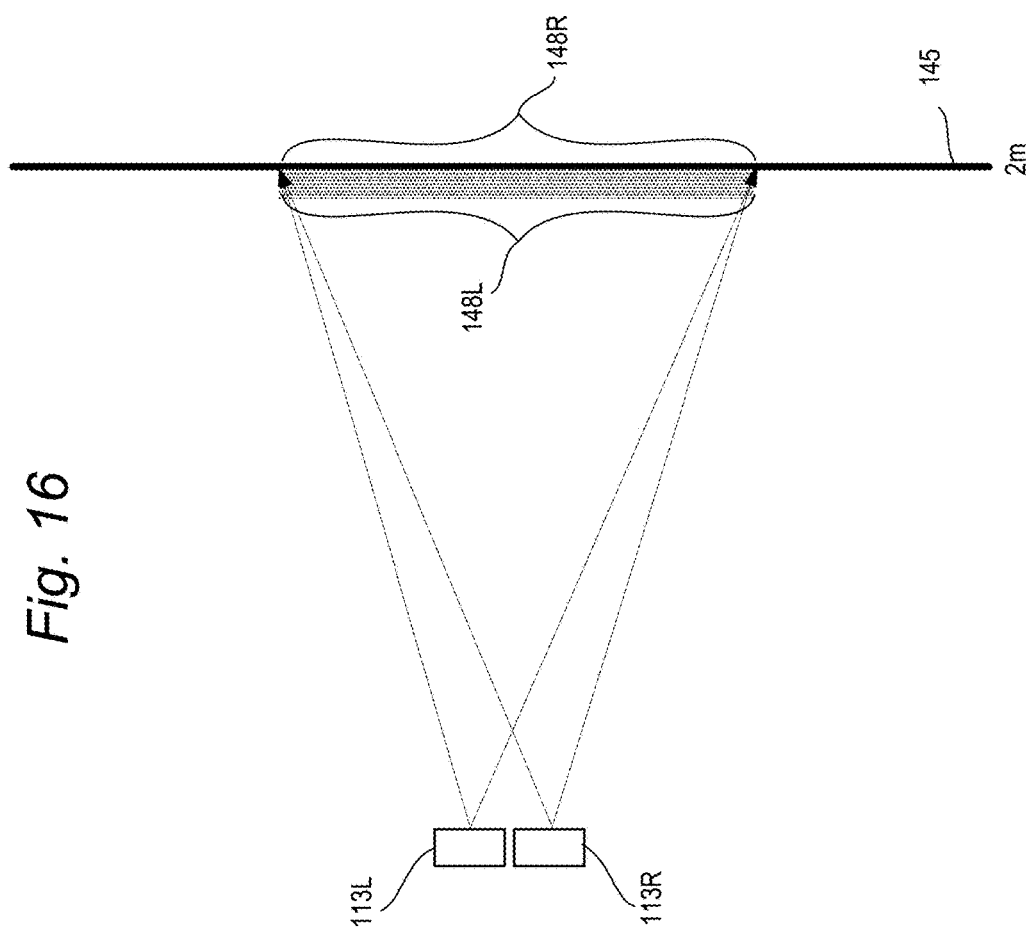
FIG. 16 is a top view of a pair optical lens assemblies displaying left and right images overlapped at a focal distance.

After the one-time calibration process shown in FIG. 13, the displayed left and right images 148L and 148R may thereafter display on the defined focal plane. For example, as shown in FIG. 16, where the focal plane 145 is set to 2 m, the calibration process of FIG. 13 allows complete horizontal stereo overlap of the left and right images 148L and 148R.

While less than complete vertical overlap is not a function of the boresight selection for the optical lens assemblies 113, it may happen that there is less than complete vertical overlap due for example to manufacturing tolerances. For this purpose, the display shift algorithm of FIG. 13 may be run after the optical lens assemblies 113L and 113R are assembled to correct for any vertical mismatch and lack of complete vertical overlap.

As noted, instead of or in addition to the one-time calibration process at manufacturing of the head mounted display device 2, the display shift algorithm may be implemented dynamically in the runtime rendering process during use of the head mounted display device 2. As one possible reason for doing this, it is conceivable that, instead of having a fixed focal plane, embodiments of the head mounted display device may have a dynamic focal plane. For example, different software applications used with the head mounted display device 2 may set a focal plane distance that is optimized for that application. As noted above, some specialized uses include flying or surgery, and a single head mounted display device 2 may be used across these disciplines using a focal plane that may be set by an application running on the processing unit 4.

Figure 17:
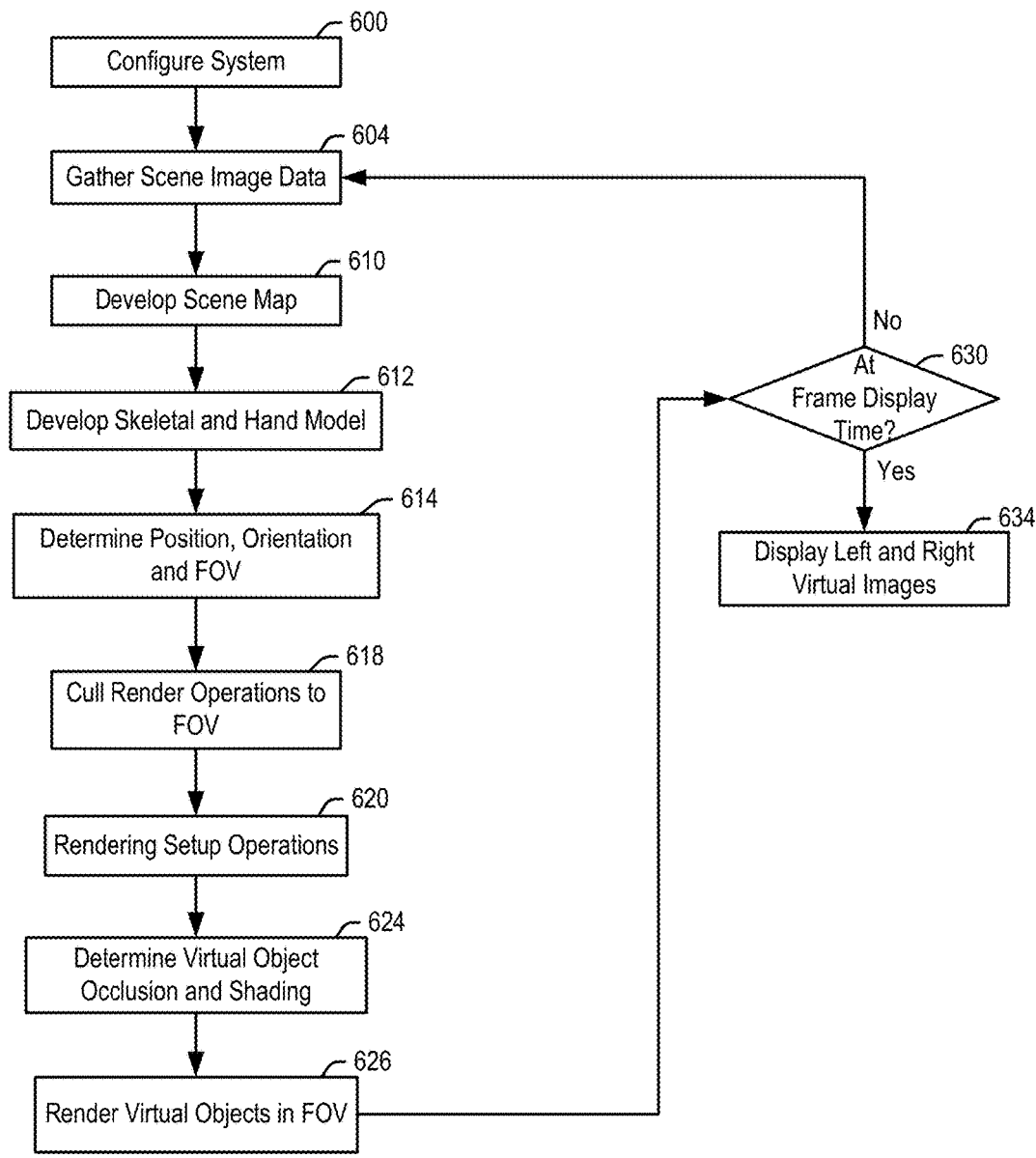
FIG. 17 is a flowchart illustrating the operation of a head mounted display device and processing unit according to embodiments of the present technology.

FIG. 17 is a high level flowchart of the operation and interactivity of the processing unit 4 and head mounted display device 2 during a discrete time period in the use of the head mounted display device 2. The discrete time period may for example be the time it takes to generate, render and display a single frame of image data to a user. In embodiments, data may be refreshed at a rate of 60 Hz, though it may be refreshed more often or less often in further embodiments.

The system for presenting a virtual environment to one or more users may be configured in step 600. As noted above, a user's IPD may affect the degree to which the left and right images overlap. Thus, step 600 may include determining a user's IPD, and automatically adjusting the image rendering stereo separation for optimal user viewing. In some systems, the optical lens assemblies may also be adjusted for IPD either using a software algorithm or mechanical adjustment of the optical lens assemblies. Techniques for automatically determining a user's IPD and automatically adjusting the optical lens assemblies to set the IPD for optimal user viewing, are discussed in U.S. Pat. No. 8,487,838, entitled "Gaze Detection In A See-Through, Near-Eye, Mixed Reality Display"; U.S. Pat. No. 9,025,252, entitled "Adjustment Of A Mixed Reality Display For Inter-Pupillary Distance Alignment"; and U.S. patent application Ser. No. 13/221,662 entitled "Aligning Inter-Pupillary Distance In A Near-Eye Display System."

In step 600, the processing unit 4 may also receive a dynamically set focal plane distance. The dynamic setting of focal plane distance is beyond the present scope. However, once the focal plane distance is set, the overlap of displayed left and right images at that distance may be controlled as explained above and below.

In steps 604 the processing unit 4 gathers data from the scene. This may be image data sensed by the head mounted display device 2, and in particular, by the room-facing cameras 112, the eye tracking assemblies 134 and the IMU 132. A scene map may be developed in step 610 identifying the geometry of the scene as well as the geometry and positions of objects within the scene. In embodiments, the scene map generated in a given frame may include the x, y and z positions of a user's hand(s), other real world objects and virtual objects in the scene.

Figure 18:
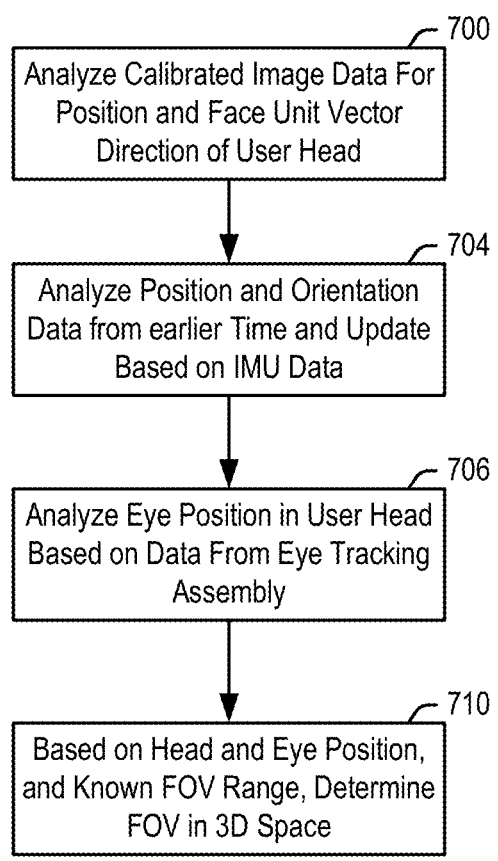
FIG. 18 shows further detail of step 614 of FIG. 17 for determining a field of view.

In step 612, the system may detect and track a user's skeleton and/or hands, and update the scene map based on the positions of moving body parts and other moving objects. In step 614, the processing unit 4 determines the x, y and z position, the orientation and the FOV of the head mounted display device 2 within the scene. Further details of step 614 are now described with respect to the flowchart of FIG. 18.

In step 700, the image data for the scene is analyzed by the processing unit 4 to determine both the user head position and a face unit vector looking straight out from a user's face. The head position may be identified from feedback from the head mounted display device 2, and from this, the face unit vector may be constructed. The face unit vector may be used to define the user's head orientation and, in examples, may be considered the center of the FOV for the user. The face unit vector may also or alternatively be identified from the camera image data returned from the room-facing cameras 112 on head mounted display device 2. In particular, based on what the cameras 112 on head mounted display device 2 see, the processing unit 4 is able to determine the face unit vector representing a user's head orientation.

In step 704, the position and orientation of a user's head may also or alternatively be determined from analysis of the position and orientation of the user's head from an earlier time (either earlier in the frame or from a prior frame), and then using the inertial information from the IMU 132 to update the position and orientation of a user's head. Information from the IMU 132 may provide accurate kinematic data for a user's head, but the IMU typically does not provide absolute position information regarding a user's head. This absolute position information, also referred to as "ground truth," may be provided from the image data obtained from the cameras on the head mounted display device 2.

In embodiments, the position and orientation of a user's head may be determined by steps 700 and 704 acting in tandem. In further embodiments, one or the other of steps 700 and 704 may be used to determine head position and orientation of a user's head.

It may happen that a user is not looking straight ahead. Therefore, in addition to identifying user head position and orientation, the processing unit may further consider the position of the user's eyes in his head. This information may be provided by the eye tracking assembly 134 described above. The eye tracking assembly is able to identify a position of the user's eyes, which can be represented as an eye unit vector showing the left, right, up and/or down deviation from a position where the user's eyes are centered and looking straight ahead (i.e., the face unit vector). A face unit vector may be adjusted to the eye unit vector to define where the user is looking.

In step 710, the FOV of the user may next be determined. The range of view of a user of a head mounted display device 2 may be predefined based on the up, down, left and right peripheral vision of a hypothetical user. In order to ensure that the FOV calculated for a given user includes objects that a particular user may be able to see at the extents of the FOV, this hypothetical user may be taken as one having a maximum possible peripheral vision. Some predetermined extra FOV may be added to this to ensure that enough data is captured for a given user in embodiments. The FOV for the user at a given instant may then be calculated by taking the range of view and centering it around the face unit vector, adjusted by any deviation of the eye unit vector.

Referring again to FIG. 7, in step 618, the processing unit 4 may cull the rendering operations so that just those virtual objects which could possibly appear within the final FOV of the head mounted display device 2 are rendered. The positions of other virtual objects may still be tracked, but they are not rendered. It is also conceivable that, in further embodiments, step 618 may be skipped altogether and the entire image is rendered.

The processing unit 4 may next perform a rendering setup step 620 where setup rendering operations are performed using the scene map and FOV received in steps 610 and 614. Once virtual object data is received, the processing unit may perform rendering setup operations in step 620 for the virtual objects which are to be rendered in the FOV. The setup rendering operations in step 620 may include common rendering tasks associated with the virtual object(s) to be displayed in the final FOV. These rendering tasks may include for example, shadow map generation, lighting, and animation. In embodiments, the rendering setup step 620 may further include a compilation of likely draw information such as vertex buffers, textures and states for virtual objects to be displayed in the predicted final FOV.

In accordance with aspects of the present technology, the rendering setup operations of step 620 may further execute the display shift algorithm to determine the horizontal and/or vertical shift of the displayed images 148L and 148R for a defined distance, such as the focal distance currently being used by the head mounted display device. Details of the display shift algorithm executed at runtime rendering setup step 620 may be the same as explained above with respect to the steps 406-414 of the flowchart of FIG. 13, and the views of FIGS. 14-16. While the display shift algorithm is described as being performed as part of the rendering setup operations 620, it is understood that the display shift algorithm may be performed at any point during the flowchart of FIG. 17 after the distance, such as the focal distance, is set.

Using the information regarding the locations of objects in the 3-D scene map, the processing unit 4 may next determine occlusions and shading in the user's FOV in step 624. In particular, the scene map has x, y and z positions of objects in the scene, including any moving and non-moving virtual or real objects. Knowing the location of a user and their line of sight to objects in the FOV, the processing unit 4 may then determine whether a virtual object partially or fully occludes the user's view of a real world object. Additionally, the processing unit 4 may determine whether a real world object partially or fully occludes the user's view of a virtual object.

In step 626, the GPU 322 of processing unit 4 may next render images 148L and 148R to be displayed to the user, with the overlap adjusted as explained above. Portions of the rendering operations may have already been performed in the rendering setup step 620 and periodically updated. Any occluded virtual objects may not be rendered, or they may be rendered. Where rendered, occluded objects will be omitted from display by the opacity filter 114 as explained above.

In step 630, the processing unit 4 checks whether it is time to send a rendered image to the head mounted display device 2, or whether there is still time for further refinement of the image using more recent position feedback data from the head mounted display device 2. In a system using a 60 Hertz frame refresh rate, a single frame is about 16 ms.

If time to display images 184L and 184R, the images are sent to microdisplay 120 to be displayed at the appropriate pixels, accounting for adjusted overlap, perspective and occlusions. At this time, the control data for the opacity filter is also transmitted from processing unit 4 to head mounted display device 2 to control opacity filter 114. The head mounted display would then display the images 184L and 184R to the user in step 634.

On the other hand, where it is not yet time to send a frame of image data to be displayed in step 630, the processing unit may loop back for more recent sensor data to refine the predictions of the final FOV and the final positions of objects in the FOV. In particular, if there is still time in step 630, the processing unit 4 may return to step 604 to get more recent sensor data from the head mounted display device 2.

The processing steps 600 through 634 are described above by way of example only. It is understood that one or more of these steps may be omitted in further embodiments, the steps may be performed in differing order, or additional steps may be added.

In embodiments described above, a partial overlap of displayed left and right images may be adjusted at the left and right microdisplays 120 using software to substantially or completely overlap at a given distance such as the focal distance. In further embodiments, it is contemplated that the left and right microdisplays 120 may be mounted for translation on mechanical actuators. In such embodiments, instead of shifting the left and right images on the microdisplays using software, the microdisplays themselves may be shifted, under control of the processing unit 4, to achieve substantial or complete overlap of the displayed left and right images at the desired distance. Additionally, moveable transmissive optical elements, such as glass wedges, may be placed in the microdisplay image path to introduce lateral and vertical shifts in the image position.

Additionally, embodiments described above provide a method for increasing the overlap of displayed left and right images to reduce or remove side bands which may appear dimmer. However, it is conceivable to provide a system where it is desirable to decrease overlap of the displayed left and right images at a certain predefined distance. The present technology may operate to decrease overlap at a predefined distance using the system and method described above.

Embodiments of the present technology may be implemented on computer readable media. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium does not include transitory, modulated or other types of signals.

In summary, an example of the present technology relates to a system for controlling an amount of overlap of displayed left and right images, the displayed left and right images presenting a virtual environment, comprising: a head mounted display device including one or more displays for displaying the left and right images; and a processing unit operatively coupled to the display device, the processing unit configured to shift the displayed left image and to shift the displayed right image at least one of horizontally and vertically, to alter at least one of a horizontal and vertical overlap of the left and right images at a defined distance from the head mounted display device.

Another example of the present technology relates to a method of displaying left and right images in a system displaying virtual images, the system comprising at least one display for displaying the left and right images and left and right optical lens assemblies through which the left and right images are displayed, method comprising: (a) determining a focal distance at which the left and right optical assemblies focus the left and right images; (b) determining an overlap of the left and right images at the focal distance; and (c) horizontally shifting the left and right images displayed by the at least one display to align horizontally with each other at the focal distance.

In a further example, the present technology relates to a computer readable storage medium for controlling a processor to perform a method of displaying left and right images in a system displaying virtual images, method comprising: (a) configuring first and second displays to display first and second images, the first and second image creating a 3D stereopsis effect when viewed by left and right eyes, the first display having an overall field of native pixels that is larger than the first image so that a border of pixels exists at at least one edge of active pixels used to display the first image, the border of pixels not used to display the first image; (b) determining a distance at which to shift the first and second images to greater overlap each other; (c) determining an overlap of the first and second images at the distance; and (d) shifting the first image into the border of pixels to overlap to a greater degree with the second image at the distance.

In another example, the present technology relates to a means for controlling an amount of overlap of displayed left and right images, the displayed left and right images presenting a virtual environment, comprising: means for displaying the left and right images; and processing means operatively coupled to the display means, the processing means shifting the displayed left image and shifting the displayed right image at least one of horizontally and vertically, to alter at least one of a horizontal and vertical overlap of the left and right images at a defined distance from the display means.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A system for controlling an amount of overlap of displayed left and right images, the displayed left and right images presenting a virtual environment, comprising:
  a head mounted display device including one or more displays for displaying the left and right images; and
  a processing unit operatively coupled to the display device, the processing unit configured to:
    generate a scene map based at least on data collected by an inertial measurement unit including at least one of an accelerometer, a gyroscope, or a magnetometer;
    determine, based at least on the scene map, at least one of a horizontal distance or a vertical distance between the displayed left and right images; and
    shift at least one of a horizontal position or a vertical position of each of the displayed left and right images to alter at least one of a horizontal and vertical overlap of the displayed left and right images at a predefined distance from the head mounted display device, wherein the displayed left and right images are shifted by at least one of one half of the horizontal distance or one half of the vertical distance.

2. The system of claim 1, wherein the processing unit is further configured to shift the left and right displayed images to overlap each other at the predefined distance.

3. The system of claim 1, the left displayed image being part of an overall field of native pixels, the overall field of native pixels including a border of pixels around the left displayed image and unused by the displayed image prior to the left image being shifted.

4. The system of claim 3, the processing unit is further configured to shift the left image into the border of pixels around the left displayed image.

5. The system of claim 1, wherein the predefined distance is a focal distance at which the left and right displayed images are focused.

6. The system of claim 1, further comprising left and right optical lens assemblies through which light from the left and right images passes, at least one lens within at least one of the left and right optical lens assembly defining a focal distance at which at least one of the left and right displayed images are focused.

7. The system of claim 6, wherein the predefined distance is the focal distance.

8. The system of claim 1, wherein the predefined distance changes with different software applications run by the processing unit, wherein the amount by which the left image is shifted and the amount by which the right image is shifted changes with a change in the predefined distance.

9. A method of displaying left and right images in a system displaying virtual images, the system comprising at least one display for displaying the left and right images and left and right optical lens assemblies through which the left and right images are displayed, method comprising:
   determining a focal distance at which the left and right optical assemblies focus the left and right images;
   generating a scene map based at least on data collected by an inertial measurement unit including at least one of an accelerometer, a gyroscope, or a magnetometer;
   determining, based at least on the scene map, an overlap of the left and right images at the focal distance; and
   horizontally or vertically shifting the left and right images displayed by the at least one display to align horizontally or vertically with each other at the focal distance, wherein the displayed left and right images are shifted by at least one of one half of a horizontal distance or one half of a vertical distance between the left and right images.

10. The method of claim 9, further comprising vertically shifting the left and right images displayed by the at least one display to align vertically with each other at the focal distance.

11. The method of claim 9, further comprising providing a border of pixels around active pixels used to display the left image, the left image horizontally shifting into the border of pixels.

12. The method of claim 9, wherein determining the focal distance, determining the overlap, and horizontally or vertically shifting the left and right images are performed at a time when the at least one display and the left and right optical lens assemblies are assembled together.

13. The method of claim 9, wherein horizontally or vertically shifting the left and right images is performed at a time when the left and right images are rendered during use of the system displaying virtual images.

14. The method of claim 9, further comprising varying the focal distance after a time when the at least one display and the left and right optical lens assemblies have been assembled together.

15. The method of claim 9, wherein horizontally or vertically shifting the left and right images is performed by a mechanical actuator shifting the at least one display.

16. The method of claim 9, wherein horizontally or vertically shifting the left and right images is performed by a software algorithm executed by a processor associated with the at least one display.

17. The computer readable storage medium of claim 16, wherein shifting the first image comprises shifting the first image to completely overlap with the second image, the second image shifted in an equal and opposite direction, in the event there are enough pixels in the border to completely shift the first image.

18. A computer readable storage medium for controlling a processor to perform a method of displaying left and right images in a system displaying virtual images, method comprising:
   configuring first and second displays to display first and second images, the first and second image creating a 3D stereopsis effect when viewed by left and right eyes, the first display having an overall field of native pixels that is larger than the first image so that a border of pixels exists at least one edge of active pixels used to display the first image, the border of pixels not used to display the first image;
   generating a scene map based at least on data collected by an inertial measurement unit including at least one of an accelerometer, a gyroscope, or a magnetometer;
   determining, based at least on the scene map, a distance at which to shift the first and second images to greater overlap each other;
   determining an overlap of the first and second images at the distance; and
   shifting the first image into the border of pixels to overlap to a greater degree with the second image at the distance, wherein the displayed left and right images are shifted by at least one of one half of a horizontal distance or one half of a vertical distance between the left and right images.

19. The computer readable storage medium of claim 18, wherein determining the distance comprises setting a focal distance, the focal distance being the distance at which the first and second images are shifted to overlap each other.

* * * * *